US012803192B2

(12) United States Patent
Mastel

(10) Patent No.: US 12,803,192 B2
(45) Date of Patent: Nov. 17, 2026

(54) CONTACT PIECE, CONTACT INSERT, PLUG CONNECTOR, CUT SHEET SECTION, AND DISTRIBUTION BLOCK

(71) Applicant: WAGO Verwaltungsgesellschaft mbH, Minden (DE)

(72) Inventor: Rudolf Mastel, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 559 days.

(21) Appl. No.: 18/369,453

(22) Filed: Sep. 18, 2023

(65) Prior Publication Data

US 2024/0097356 A1 Mar. 21, 2024

(30) Foreign Application Priority Data

Sep. 19, 2022 (DE) ..................... 20 2022 105 273.5

(51) Int. Cl.
*H01R 4/48* (2006.01)
*H01R 9/24* (2006.01)
*H01R 43/16* (2006.01)

(52) U.S. Cl.
CPC ....... *H01R 4/48365* (2023.08); *H01R 9/2491* (2013.01); *H01R 43/16* (2013.01); *H01R 4/4809* (2013.01)

(58) Field of Classification Search
CPC .. H01R 4/48365; H01R 9/2491; H01R 43/16; H01R 4/4809; H01R 4/4816; H01R 4/48275; H01R 4/4837
See application file for complete search history.

(56) References Cited

U.S. PATENT DOCUMENTS

| | | | | |
|---|---|---|---|---|
| 7,329,143 | B2 * | 2/2008 | Schrader | H01R 4/485 439/441 |
| 9,502,795 | B1 * | 11/2016 | Wu | H01R 4/4852 |
| 10,707,594 | B1 * | 7/2020 | Wu | H01R 4/4821 |
| 11,043,759 | B2 | 6/2021 | Ober-Woerder | |
| 11,387,582 | B2 | 7/2022 | Stolze | |
| 2011/0207372 | A1 | 8/2011 | Breen, IV | |
| 2017/0162969 | A1 | 6/2017 | Jou | |

FOREIGN PATENT DOCUMENTS

| | | | | |
|---|---|---|---|---|
| DE | 4210020 | A1 | 9/1993 | |
| DE | 20312861 | U1 | 10/2003 | |
| DE | 102016013812 | A1 | 6/2017 | |
| DE | 202017105467 | U1 * | 12/2018 | H01R 4/483 |
| DE | 202018106896 | U1 | 3/2020 | |
| DE | 102019111214 | A1 | 11/2020 | |
| DE | 102020102605 | B3 | 6/2021 | |
| DE | 212019000423 | U1 | 7/2021 | |
| EP | 2096714 | | 9/2009 | |
| EP | 2442403 | A1 * | 4/2012 | H01R 4/4816 |

* cited by examiner

*Primary Examiner* — Renee S Luebke
*Assistant Examiner* — Paul D Baillargeon
(74) *Attorney, Agent, or Firm* — Muncy, Geissler, Olds & Lowe, P.C.

(57) ABSTRACT

A contact piece for a contact insert of a plug connector, the contact piece having a base section, a contact pin connection, and a conductor receptacle with a conductor seating section for clamping an electrical conductor with the aid of a clamping spring. The conductor seating section being bent away from the base section and fixed on the base section and/or the contact pin connection with the aid of a support contour.

21 Claims, 5 Drawing Sheets

CONTACT PIECE, CONTACT INSERT, PLUG CONNECTOR, CUT SHEET SECTION, AND DISTRIBUTION BLOCK

This nonprovisional application claims priority under 35 U.S.C. § 119(a) to German Patent Application No. 20 2022 105 273.5, which was filed in Germany on Sep. 19, 2022, and which is herein incorporated by reference.

BACKGROUND OF THE INVENTION

Field of the Invention

The invention relates to a contact piece for a contact insert of a plug connector, the contact piece having a base section, a contact pin connection, and a conductor receptacle with a conductor seating section for clamping an electrical conductor with the aid of a clamping spring. The invention also relates to a contact insert for a plug connector as well as a plug connector having a contact piece of this type, and a cut sheet section for manufacturing a contact piece for a plug connector. The invention furthermore relates to a distribution block having at least two contact pieces.

Description of the Background Art

Contact pieces for plug connectors are known from electrical connecting systems. Plug connectors are used as electromechanical connecting components for connecting flexible and rigid electrical conductors to establish an electrical connection. The plug connectors may have, for example, spring-force clamping connections, in which the electrical conductors are clamped against an electrically conductive contact piece with the aid of the spring force of a clamping spring. The joint arrangement of the contact piece and clamping spring against each other is referred to in the present case as a contact insert. For example, the clamping spring may be suspended in the contact piece or be otherwise, preferably detachably, arranged thereon.

In the mounted state, the clamping spring applies a contact force to the contact piece with the aid of its spring force as well as indirectly to adjacent components, for example a surrounding insulating housing of the plug connector. Due to the comparatively limited strength of the insulating housing, which is generally made of plastic, with respect to the contact piece, the contact force introduced thereinto and the support of the contact piece on the housing may prove to be mechanically disadvantageous and reduce the service life of the plug connector. Efforts have therefore been made in practice to develop self-supporting contact systems having a more favorable force absorption, in which the introduction of force into adjacent components is reduced.

In the past, contact inserts including contact piece and clamping springs have already been developed, which are mechanically supported against each other at multiple points and are thus themselves able to absorb a portion of the contact force. However, it has been found that the force absorption is not yet optimal, and a portion of the contact force is still taken up by adjacent components. In addition, if the distribution of force in the contact piece is unfavorable, elastic deformations or displacements may occur, which are disadvantageous for a reliable connection function.

SUMMARY OF THE INVENTION

It is therefore an object of the invention to provide a contact piece as well as a contact insert and a plug connector which includes a contact piece of this type, with the aid of which a more favorable force distribution is possible for a self-supporting contact system. In addition, a suitable cut sheet section for manufacturing a contact piece of this type and a distribution block including at least two contact pieces are to be specified.

According to an example, a contact piece for a plug connector is proposed, the contact piece having a base section, a contact pin connection, and a conductor receptacle with a conductor seating section for clamping an electrical conductor with the aid of a clamping spring.

A contact piece can be understood to be an electrically conductive component for a contact insert of a plug connector, to which an electrical conductor may be clamped with the aid of a clamping spring. The contact piece can also be referred to in practice as a conductor rail or busbar, contact bar or power rail or even just as a contact. This may be a component having a predominantly planar design with a much greater length and width extension than height extension, which may also, for example, be bent in sections to form a receptacle or an insertion section for electrical conductors or a contact section. The contact piece may be manufactured from a material having a high electrical conductivity, for example a metal.

The clamping spring may be arranged on the contact piece so that the contact piece and the clamping spring form a contact insert, which may be, for example, pre-mounted and inserted into a plug connector. The clamping spring may be a component of a predominantly planar, for example also strip-shaped, design with a much greater length and width extension than depth extension, which is generally manufactured from an elastically resilient material and includes a contact leg for support, a clamping leg for clamping the conductor to the contact piece, as well as a spring bend between the contact leg and the clamping leg.

The contact piece has a contact pin connection. The contact pin connection may be designed, for example. as a contact pin or as a contact pin receptacle. The contact pin or the contact pin receptacle may be designed to be integral with the contact piece. In the case of a contact pin receptacle, a contact pin—generally a rigid electrical conductor—may be inserted into an area of the contact piece, so that the contact pin may contact the contact piece, and an electrical connection of the contact pin may be established. Conversely, if the contact pin connection is designed as a contact pin, the contact pin of the contact piece may be connectible to a contact pin receptacle, which is not part of the contact piece or the plug connector. In the case of a contact pin connection designed as a contact pin, the contact pin may protrude from the base section with one or two contact pin arms. The contact piece also has a conductor receptacle with a conductor seating section for clamping an electrical conductor with the aid of a clamping spring. This means that a, for example flexible, electrical conductor may be inserted into an area of the contact piece so that the electrical conductor contacts the contact piece on a conductor seating section, and an electrical connection of the conductor may be established, the clamping spring fixing the electrical conductor on the contact piece and hereby securing and improving the electrical connection. The section of the contact piece on which an electrical conductor may rest and be pressed against the contact piece with the aid of a clamping leg of the clamping spring is referred to as the conductor seating section.

The contact piece also has a base section, which connects the contact pin connection and the conductor receptacle to each other and may take on further functions, for example forming a support or guide surface or a receiving pocket. The base section may have a U shape with a rear wall and two side walls bent away from the rear wall. The base section stabilizes the contact piece and forms a base for the contact pin connection as well as the conductor receptacle of the contact piece.

According to the invention, it is provided that the conductor seating section is bent away from the base section and fixed on the base section and/or the contact pin connection with the aid of a support contour.

The conductor seating section is thus a section of the contact piece, which is bent away from the base section, forming a radius, so that the conductor seating section and the adjacent base section run at an angle to each other. The angle may be designed for example as an essentially right angle, i.e., approximately 90°. The support contour permits a support of the conductor seating section on the base section and/or the contact pin connection. Due to the support, the contact force of the clamping spring introduced into the conductor seating section is conducted back into the contact piece at least partially into the base section or the contact pin connection, so that an improved self-retention of the contact insert is achieved. The support contour may be designed, for example, as a bearing projection of the contact piece on a side of the conductor seating section opposite the clamped conductor. The bearing projection may be formed, for example, in a web-like manner and be bent away from the base section or the contact pin connection.

The support contour may also be designed, for example, as a latching contour, so that the conductor seating section may be fixed on the base section and/or the contact pin connection by latching engagement. The latching contour may be formed by a latching tab or a latching hook which engages behind a latching edge. The latching edge may be formed, for example, by a contact piece edge on the base section or the contact pin connection; however, a corresponding latching opening on the contact piece may also be provided, with which the latching contour may engage. Compared to the use of a contact piece edge as the latching edge, a latching opening may limit further degrees of freedom of the latching contour and thus effectuate a defined and secure hold of the contact piece sections against each other. The latching contour can be formed on the conductor seating section, although it is also possible, that the latching contour is present on the base section and/or the contact pin connection. The term “fixed” may refer, for example, to a force-fitting and/or form-fitting fixing of the contact pin on the base section and/or the contact pin connection, in which a movement or displacement of the conductor seating section is prevented in at least one spatial direction.

Due to the fact that the conductor seating section is bent away from the base section and is fixed on the base section and/or the contact pin connection with the aid of a support contour, a contact piece may be provided for a contact insert, which has a very favorable force distribution, a high degree of self-retention for a self-supporting contact system, and a much higher dimensional stability compared to known contact piece designs. Due to the fact that the conductor seating section is fixed with the aid of the support contour in its bent state, it is not bent away from the electrical conductor under the contact force of the clamping spring. The conductor seating section is supported on the rest of the contact piece. Moreover, the contact piece according to the invention is easy to manufacture.

The contact piece may be provided with a one-piece design. For example, the base section, the contact pin connection, the conductor receptacle, and a support contour of the contact piece may be integrally connected to each other, i.e., they may be present in the form of single piece without any additional connectors between the constituent parts of the contact piece. The contact piece may be formed, for example, from a flat sheet metal piece and obtain its useful shape by stamping out a defined two-dimensional geometric contour from a semi-finished sheet metal product and by means of bends in different spatial directions at predetermined positions of the sheet metal strip, so that the three-dimensional contact piece may be manufactured from an essentially two-dimensional cut sheet section. The contact piece is particularly easy to manufacture in the form of a single piece.

The contact pin connection and the conductor receptacle may be oriented with respect to each other in such a way that a conductor insertion direction of the electrical conductor and a contact pin insertion direction run at an angle to each other. The angle between the conductor insertion direction and the contact pin insertion direction may preferably be essentially 90°. In alternative examples, however, a parallel course of the conductor insertion direction and the contact pin insertion direction or a course of the conductor insertion direction and the contact pin insertion direction toward each other is, in principle, also conceivable. The angle between the conductor insertion direction and the contact pin insertion direction may thus alternatively also be, for example, essentially 180°. If the conductor insertion direction and the contact pin insertion direction run at an angle to each other, in particular at an essentially right angle, a particularly compact contacting solution may be made possible.

The contact pin connection may be designed as a contact pin, which includes at least one contact pin arm protruding from the base section, or as a contact pin receptacle, which includes at least one contact pin receiving arm protruding from the base section. For example, a contact pin may have two diametrically opposed contact pin arms which run toward each other and which protrude from the base section. For example, a contact pin receptacle may have two diametrically opposed contact pin receiving arms which run toward each other and which protrude from the base section. The contact pin arms or the contact pin receiving arms may also optionally touch each other. The contact pin arms or the contact pin receiving arms are preferably elastically deflectable and resiliently return to their initial position after the elimination of a deflection caused, for example, by a contact pin or a contact pin receptacle. A contact pin may be easily inserted into a contact pin connection designed as a contact pin receptacle, as well as securely fixed and contacted, with the aid of the contact pin receiving arms. A contact pin connection designed as a contact pin may be easily inserted into a contact pin receptacle as well as securely fixed in place and contacted with the aid of the contact pin arms.

If the support contour is designed as a latching contour, the latching contour may engage with an associated latching opening. The latching open may be a bore, a groove, or another type of recess at a position of the contact piece where the latching contour may engage with the latching opening in a bent state of the conductor seating section. The latching opening may be dimensioned to fit the latching contour, and the boundary of the latching opening may at least partially enclose the latching contour when the latter engages with the latching opening. The latching opening may represent a negative contour of the latching contour, i.e., the geometric shape of the latching opening and the latching contour may correspond to each other. The latching contour and opening may have, for example, round or angular geometric shapes. A latching opening effectuates a defined and secure hold of the conductor seating section on the base section and/or the contact pin connection.

The latching opening may be arranged on the base section and/or the contact pin connection. The conductor seating section then has a latching contour, which engages with the latching opening on the base section and/or the contact pin connection. In principle, a reverse arrangement is not ruled out with the latching contour on the base section and/or the contact pin connection and a latching opening on the conductor seating section.

The support contour may be situated in the plane of the conductor seating section. The plane of the conductor seating section is spanned and defined by its length and width extensions, which are each greater than the height extension of the conductor seating section. The conductor seating section is thus provided with a planar design having a low height dimension, the entire contact piece being provided, in principle, with a planar design and being able to be manufactured from a planar semi-finished product for this purpose. The support contour may protrude laterally from the conductor seating section in the plane thereof. "In the plane" may mean that the support contour is not bent or angled away from the conductor seating section but rather protrudes therefrom in a straight line in an extension of the longitudinal or width extension of the conductor seating section. The support contour may be, for example, a material projection, which terminates flush with an upper side and/or underside of the conductor seating section. The upper side of the conductor seating section is the surface of the conductor seating section, on which a connected electrical conductor is guided and clamped, while the underside is the side of the conductor seating section opposite the upper side and facing away therefrom. An easy manufacture of the contact piece is made possible by the arrangement of the support contour in the plane of the conductor seating section, and an electrical conductor to be clamped is not impaired by the support contour.

It is also possible that the support contour can be bent away from the conductor seating section. The support contour may, for example, also protrude from the conductor seating section over a double, for example S-shaped, bend. The support contour may protrude into an area above or below the plane of the conductor seating section. Alternative structural implementation possibilities for fixing may be provided hereby for different application options.

The conductor seating section may have at least two support contours situated opposite each other, which fix the conductor seating section on the base section and/or the contact pin connection in its bent state. The support contours may each protrude, for example, from one side of the conductor seating section and engage behind a latching edge on the base section and/or the contact pin connection, for example as latching contours, or engage with a particular latching opening. The latching openings may be, for example recesses situated opposite each other on the base section and/or the contact pin connection, into which the latching contours of the conductor seating section may be hooked when the latter is bent away from the base section, so that the conductor seating section is fixed in its bent state and is unable to bend away from the electrical conductor, for example under the contact force of the clamping spring. A symmetrical support and introduction of force of the conductor seating section into the contact piece is made possible by at least two support contours situated opposite each other. A better hold of the conductor seating section on the base section and/or the contact pin connection is also achieved, and the contact piece is in itself more dimensionally stable.

The contact piece may have a spring receiving section with a spring receptacle for fastening a clamping spring on the contact piece. The spring receptacle may be, for example, an opening or recess for suspending or latching a fastening contour of the clamping spring. The spring receiving section may be bent away from the base section of the contact piece. The spring receiving section may have a spring support, against which a fastened clamping spring may be additionally supported on the contact piece. A secure and stable fastening of the clamping spring on the contact piece is made possible by a spring receptacle on the contact piece.

The contact piece may be configured to receive at least two clamping springs. For example, one clamping spring may be arranged above the conductor seating section and clamp an electrical conductor against the upper side of the conductor seating section, and one clamping spring may be arranged below the conductor seating section and clamp a further electrical conductor against the underside of the conductor seating section. The clamping springs may thus be arranged on opposite sides of the conductor seating section and permit the clamping of two electrical conductors on the conductor seating section. The contact piece may be structurally adapted hereto, for example it may have a common base section for both spring clamps to form two pocket-shaped conductor receptacles, and/or it may have two spring receiving sections, each with one spring receptacle and optionally having a spring support. A further connecting option is provided hereby. The absorption of force and thus the self-supporting function of the contact piece and contact insert are also further improved by a symmetrical loading of the conductor seating section.

The base section, the contact pin connection, the conductor seating section, and/or the spring receiving section may be at least partially coated. Different possibilities are conceivable, for example a complete coating of the contact piece, a partial coating by coating only an upper surface side of the contact piece, a partial coating by coating individual sections of the contact piece, for example by selectively coating the contact pin connection and the conductor receptacle, or different coating materials for different sections of the contact piece. The coating may be, for example, a coating for increasing the electrical conductivity or for improving the mechanical resistance of the contact piece. The coating may take place in a state of the contact piece, in which the contact piece is still present as a planar, unbent cut sheet section, which simplifies the coating process. Due to the at least partial coating of the contact piece, the properties of the contact piece may be optimized and also individually adapted selectively for individual section of the contact piece. In particular, a cost-optimized coating may be achieved hereby.

The conductor seating section, a rear wall of the base section, and the spring receiving section may be arranged with respect to each other in a U-shaped or C-shaped manner. The conductor seating section and the spring receiving section are situated opposite each other and form the legs of the U or C shape, which are connected to each other via the base section. The rear wall of the base section runs, at least in part, essentially perpendicularly to the conductor seating section and the spring receiving section. Due to the U-shaped or C-shaped arrangement, a particular compact contact piece may be provided.

The invention also relates to a contact insert for a plug connector, including a contact piece according to one of the features described above and including a clamping spring inserted into the contact piece. A self-supporting, stable contact insert having improved force absorption is obtained hereby, which is also easy to manufacture.

The contact insert may have a clamping spring with an open spring contour. An open spring contour is when the clamping spring is bent in such a way that the spring legs do not touch each other. For example, the clamping spring may have a U shape or a C shape. Clamping springs of this type are also referred to in practice as "C springs." Due to their shape, clamping springs with open spring contours are frequently more elastic than clamping springs whose spring legs are supported on each other and must therefore usually be more strongly supported. An improved self-retention of the contact insert may be achieved with the contact insert according to the invention, so that the clamping spring does not have to be supported on the insulating housing or is only minimally supported thereon.

The invention also relates to a plug connector, including a contact piece according to one of the features described above or including a contact insert according to one of the features described above. The advantages according to the invention are also achieved by a plug connector of this type.

The invention also relates to a cut sheet section for manufacturing a contact piece for a plug connector, the cut sheet section having the following features in an unbent, planar state: the cut sheet section has a base section; two material tongues, which extend essentially in parallel to each other and are provided for forming contact pin arms or contact pin receiving arms for a contact pin connection of the contact piece, protrude from the base section in a first direction; a material strip, which is provided for forming a conductor seating section of a conductor receptacle of the contact piece, extends between the material tongues essentially in parallel thereto; and/or at least one material tongue, the base section, and/or the material strip has/have a support contour, which is suitable for fixing the material strip in a bent position on the base section and/or the contact pin connection after a bending operation.

The cut sheet section describes an example of the contact piece according to the invention in a manufacturing-specific initial state, in which the contact piece is still present as a planar, essentially two-dimensional cut section and must still be bent into its predefined three-dimensional shape for use as a contact piece. The cut sheet section may be cut or stamped out of a planar semi-finished sheet metal product. The length and width extensions of the cut sheet section may each be much greater than the height extension of the cut sheet section. The cut sheet section is thus designed to be planar with a low height dimension and has a defined contour, which forms the outlines of the contact piece bent to shape later on. The sections of the contact piece, such as the base section, contact piece connection, and conductor receptacle, may be assigned to certain material areas of the cut sheet section, since these material areas will form these sections of the contact piece after a bending operation. The material areas of the cut sheet section protruding from the base section are referred to in the present case as material tongues, material strip, material wings, and material tab.

The proposed cut sheet section has little geometric complexity and is therefore easy to manufacture. The contact piece according to the invention may be easily manufactured with the aid of the cut sheet section. Only a few bends on the cut sheet section are necessary to achieve the desired three-dimensional contact piece.

In the base section, a bending surface may be arranged in each case between a material tongue and the material strip, and a further bending surface may be arranged between the base section and the material strip. A bending surface may be a limited surface section, which is provided for bending the cut sheet section into a contact piece. The bending aims for an angled profile of the sections of the contact piece adjacent to a bending surface with respect to each other. The bending surface may have local properties specially suitable for bending, for example a thinner sheet thickness, an optically recognizable or a structured target bending point. Due to the bending surfaces between the material tongues and the material strip, the later contact pin arms or contact pin receiving arms may be bent around the later conductor seating section and guided toward each other until they are situated opposite each other. Due to the bending surface between the base section and the material strip, the later conductor seating section may be bent away from the base section and fixed on the base section and/or the contact pin connection with the aid of the support contour. An intuitive and easy bending of the cut sheet section into the contact piece according to the invention may be achieved with the aid of the bending surfaces.

A material tab may protrude from the base section in a second direction, which is provided to form a spring receiving section of the contact piece, including a spring receptacle for fastening a clamping spring on the contact piece. The second direction may be opposite the first direction, so that the material tab protrudes on a side of the base section opposite the side from which the material tongues protrude. The material tab may protrude from the base section in an area opposite a material tongue. With the aid of the material tab, a spring receiving section may be formed on the later contact piece, with which a secure and stable fastening of the clamping spring on the contact piece is possible. The material tab may be bent away from the base section over a further bending surface.

The base section, the material tongues, the material strip, and/or the material tab of the cut sheet section may have a coating, at least in part. Different possibilities are conceivable, for example a complete coating of the cut sheet section, a partial coating by coating only an upper surface side of the cut sheet section, a partial coating by coating individual sections of the cut sheet section, for example by selectively coating the material tongues and the material strip, or different coating materials for different sections of the cut sheet section. The coating may be, for example, a coating for increasing the electrical conductivity or for improving the mechanical resistance. The coating of the cut sheet section takes place prior to the bending of the cut sheet section into a three-dimensional contact piece, which simplifies the coating process. Due to the at least partial coating of the cut sheet section, the properties of the contact piece manufactured from the cut sheet section later on may be optimized and also individually adapted selectively for individual sections of the cut sheet section.

The cut sheet section may be manufactured by stamping it out of a planar semi-finished product. The cut sheet section may be easily manufactured hereby.

The invention also relates to a distribution block, which includes at least two contact pieces and two clamping springs, the contact pieces having a base section and a conductor receptacle with at least one conductor seating section connecting the at least two contact pieces to each other for the purpose of clamping electrical conductors with the aid of the clamping springs, the conductor seating section being fixed on the base sections of the contact pieces with the aid of a support contour. For example, two contact pieces, each including one clamping spring, may be arranged side by side and be connected to each other with the aid of a continuous, common conductor seating section.

It is also conceivable to use the continuous, common conductor seating section on both sides, in that a clamping spring is arranged on each of the two sides of the conductor seating section in a contact piece. The support contour may be fixed, for example, in adjacent, for example groove-shaped, openings of the contact pieces on the base sections of the contact pieces in a form-fitting and/or force-fitting manner. The distribution block may have, for example, two contact pieces and two clamping springs, two contact pieces and four clamping springs, or four contact pieces and four clamping springs. Two contact pieces situated opposite each other may be integrally connected to each other and form a common one-piece double contact piece. The contact inserts are bridged with the aid of the common conductor seating section. The conductor seating section may be provided with a web-shaped design. A support contour may protrude from the conductor seating section in the plane of the conductor seating section, which may engage with an opening on the base sections of the contact pieces and thus be fastened thereto.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
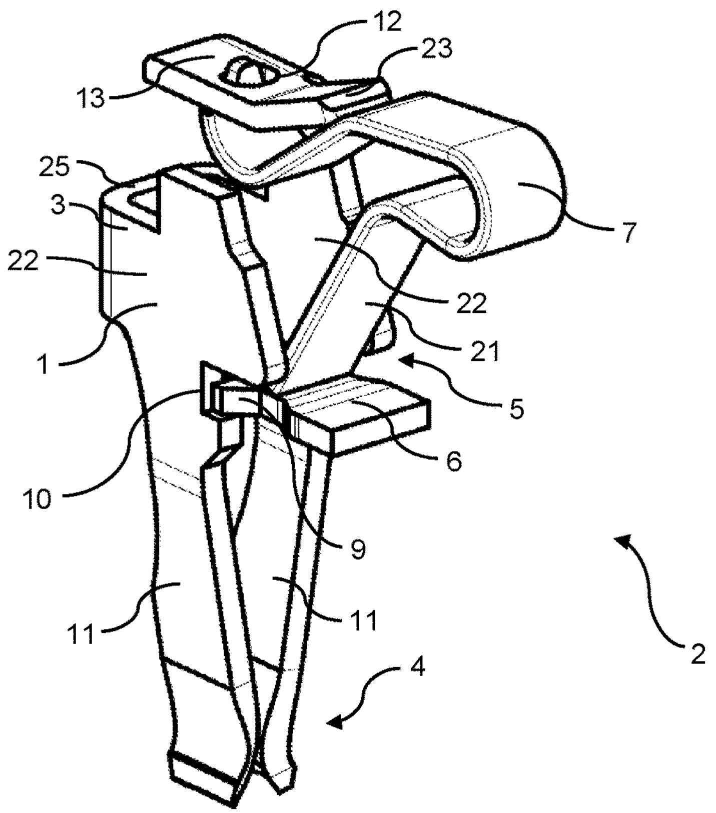
FIG. 1 schematically shows a perspective view of a contact insert for a plug connector, including a contact piece according to the invention and a clamping spring.
Figure 2:
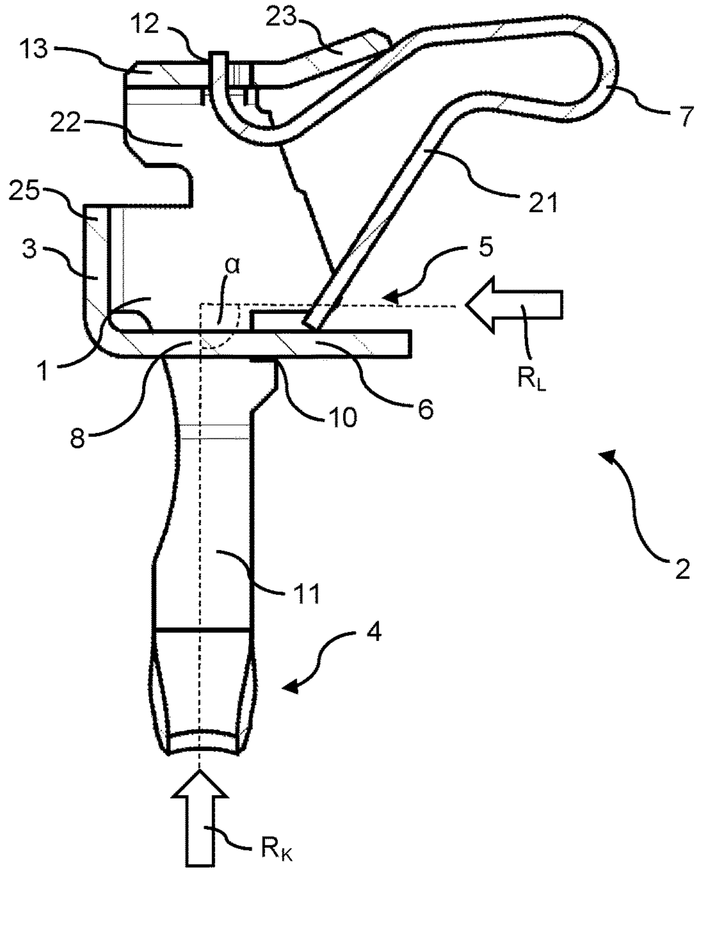
FIG. 2 schematically shows a cutaway side view of the contact insert.
Figure 3:
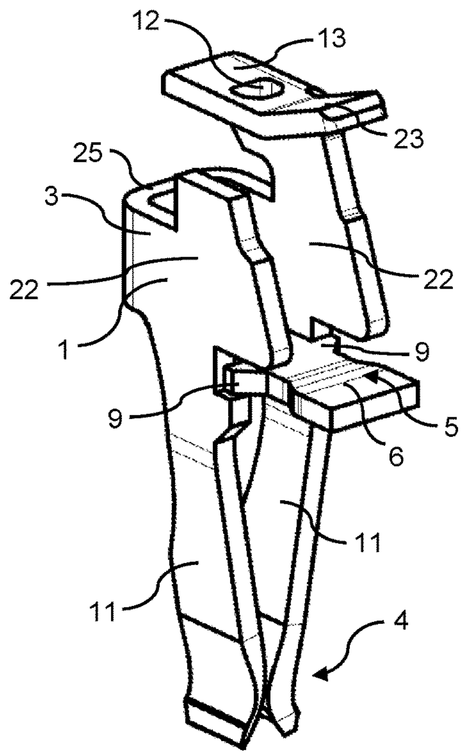
FIG. 3 schematically shows a perspective view of a contact piece without a clamping spring.
Figure 7:
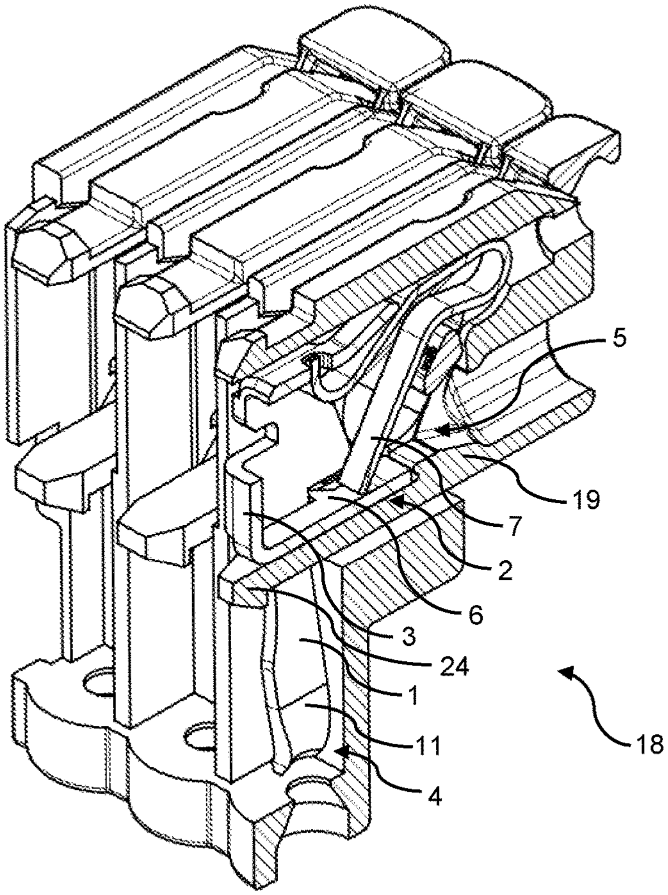
FIG. 7 shows a perspective view of a plug connector, including a contact insert and an insulating housing.

FIGS. 1 and 2 show a contact insert 2 for a plug connector 18, which is illustrated, for example, in FIG. 7, and includes a contact piece 1 according to a first example and includes a clamping spring 7. FIG. 3 shows contact piece 1 according to the first example without a clamping spring. In a plug connector 18, contact insert 2 is used to connect an electrical conductor as well as a contact pin for establishing an electrical connection.

Figure 4:
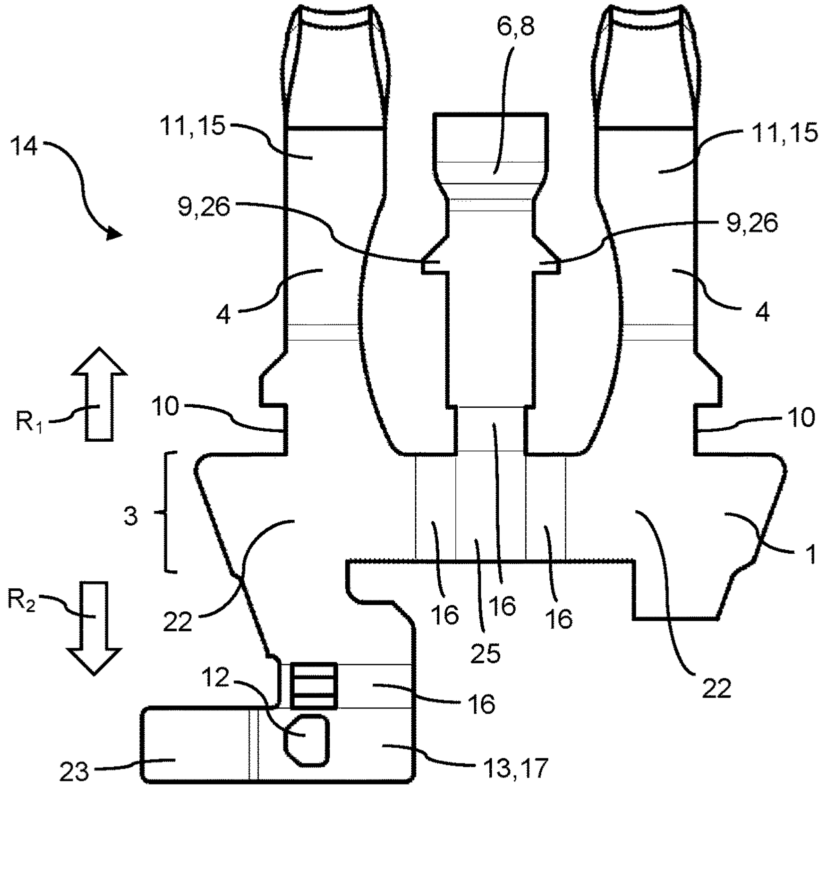
FIG. 4 schematically shows a top view of a cut sheet section for manufacturing a contact piece.

Contact piece 1 is designed as a single piece and manufactured from a planar cut sheet section 14, as is apparent, for example, from FIG. 4, in that the essentially two-dimensional cut sheet section 14 is bent into a three-dimensional contact piece 1 on multiple bending surfaces 16. Contact insert 1 has a base section 3, from which a contact pin connection 4 designed as a contact pin receptacle extends in a first spatial direction, base section 3 forming a pocket-shaped conductor receptacle 5 for an electrical conductor insertable in a second spatial direction. For the purpose of clamping the electrical conductor, conductor receptacle 5 has a conductor seating section 6, on whose surface the electrical conductor may be guided and clamped in place by spring force with the aid of a clamping leg of clamping spring 7.

Conductor seating section 6 is bent away from base section 3, so that conductor seating section 6 and adjacent base section 3, into which conductor seating section 6 transitions, run at an angle to each other, as illustrated in FIG. 2. Bent conductor seating section 6 is fixed on base section 3 with the aid of a support contour 9 designed as a latching contour. In other examples, it is conceivable that conductor seating section 6 is fixed on contact pin connection 4 with the aid of a support contour 9. By fixing bent conductor seating section 6 on base section 3 or contact pin connection 4, a favorable force distribution with a high degree of self-retention may be achieved for a self-supporting contact insert 2. Due to the fact that conductor seating section 6 is fixed with the aid of support contour 9 in its bent state, it is not bent away from a clamped electrical conductor under the contact force of clamping leg 21 of clamping spring 7. Conductor seating section 6 is supported on the rest of contact piece 1.

As clarified by arrow illustrations in FIG. 2, contact pin connection 4 and conductor receptacle 5 are oriented with respect to each other in such a way that a conductor insertion direction $R_L$ of the electrical conductor and a contact pin insertion direction $R_K$ run at an angle to each other. In the illustrated example, angle $\alpha$ between the two insertion directions is essentially 90°. A highly compact contact insert 2 is provided hereby.

Contact pin connection 4 designed as a contact pin receptacle is formed by two contact pin receiving arms 11, which are situated opposite each other, run toward each other, and protrude from base section 3. In the illustrated example, contact pin receiving arms 11 touch each other at a contact point, but diverge again adjacent to the contact point in order to form an insertion area for a contact pin. Contact pin receiving arms 11 are elastically deflectable by a contact pin and return to their original position after the contact pin is removed.

Conductor seating section 6 has two support contours 9 situated opposite each other and designed as latching tabs, as is apparent, in particular, in FIG. 3. Support contours 9 are designed as latching tabs which protrude laterally from conductor seating section 6 in the plane thereof. Support contours 9 engage with corresponding latching openings 10 in base section 3, which are cut out in an angular manner. Alternatively, support contours 9 may also engage behind only one contact piece edge as a latching edge without cutout latching openings 10. However, the mobility of support contours 9 on contact piece 1 is limited by latching openings 10, so that a more secure hold of support contour 9 on base section 3 is ensured. Alternatively, latching openings 10 may also be introduced into contact pin connection 4, for example into contact pin receiving arms 11.

Contact piece 1 has a spring receiving section 13, including a spring receptacle 12 designed as a through-opening, in which clamping spring 7 may be suspended. Spring receiving section 13 may have a spring support 23, against which clamping spring 7 may be additionally supported on contact piece 1. Clamping spring 7 may be securely supported hereby between spring receiving section 13 and conductor seating section 6. Clamping spring 7 has an open spring contour, the spring legs of clamping spring 7 not touching each other. As is apparent in the cutaway side view in FIG. 2, spring receiving section 13, a rear wall 25 of base section 3, and conductor seating section 6 form a (slightly interrupted) U shape. As is apparent in FIGS. 1 and 3, base section 3 also has a U shape due to two side walls 22 bent away from a rear wall 25. A pocket-shaped conductor receptacle 5 is provided hereby. It is apparent that latching openings 10 may be arranged in side walls 22 of base section 3.

FIG. 4 shows a cut sheet section 14 for manufacturing contact piece 1 according to the first example. Cut sheet section 14 is stamped out of a planar semi-finished product and, in the illustrated state, is present in an unbent, planar form having defined contours. By bending cut sheet section 14, particularly in bending surfaces 16 indicated, three-dimensional contact piece 1 may be manufactured for use in a plug connector 18. Cut sheet section 14 has a base section 3, which is bendable over two bending surfaces 16 into a U shape having a rear wall 25 and two side walls 22. Two material tongues 15, which extend essentially in parallel to each other, protrude from base section 3 in a first direction $R_1$. After bending cut sheet section 14 into contact piece 1, they form contact pin receiving arms 11 for contact pin connection 4 of contact piece 1 designed as a contact pin receptacle. A material strip 8, which may be bent away from base section 3 over a further bending surface 16, extends between material tongues 15 essentially in parallel thereto, and forms conductor receptacle 5 of contact piece 1 after bending conductor seating section 6. Material strip 8 has two material wings 26, situated opposite each other, which form support contours 9 of conductor seating section 6 after bending cut sheet section 14 into contact piece 1. In each area adjoined by a material tongue 15, base section 3 has an angular recess forming latching openings 10 after cut sheet section 14 is bent into contact piece 1, with which support contours 9 of bent conductor seating section 6 may engage for the purpose of fixing bent conductor seating section 6 on base section 3.

In a section direction $R_2$, which is opposite first direction $R_1$, a material tab 17 protrudes on a side of base section 3 opposite material tongues 15, essentially opposite one material tongue 15 in this example. Material tab 17 forms a spring receiving section 13 of contact piece 1 over a further bending surface 16 after bending cut sheet section 14 into contact piece 1 and, in particular, after a bending of material tab 17 away from base section 3. An opening is stamped into material tab 17, which forms spring receptacle 12 for fastening clamping spring 7 on contact piece 1. Material tab 17 also contains a material section, which forms spring support 23 after a bending of cut sheet section 14 into contact piece 1.

Cut sheet section 14 may be at least partially coated, in particular in its planar, not yet bent state, so that it has one or multiple coatings over a wide area or in areas. In particular, different sections of cut sheet section 14 may be coated individually and independently of each other in the planar state.

Figure 5:
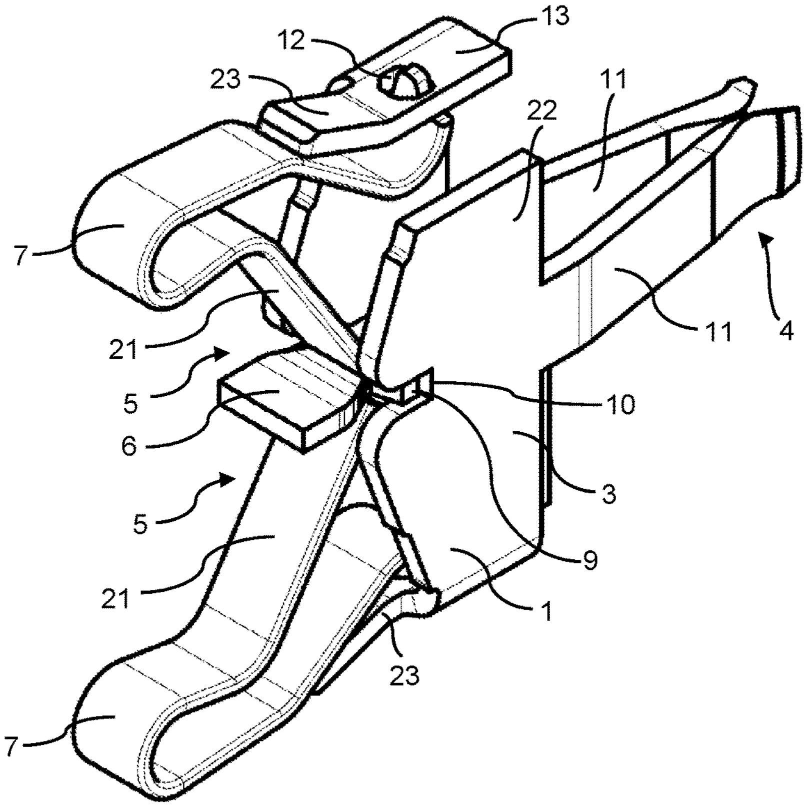
FIG. 5 schematically shows a perspective view of a contact insert for a plug connector, including a contact piece according to the invention and two clamping springs.
Figure 6:
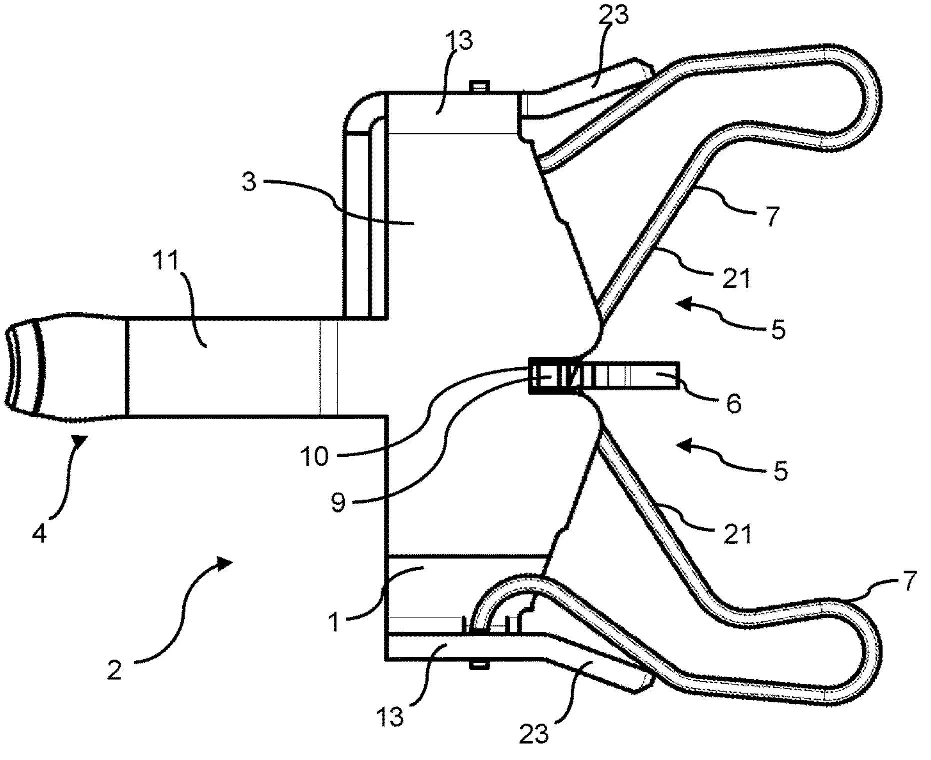
FIG. 6 schematically shows a side view of the contact insert according to FIG. 5.

FIGS. 5 and 6 show a second example of contact insert 2, including a structurally adapted contact piece 1. In this example, two clamping springs 7 are provided for a common contact piece 1, which are arranged on both sides of conductor seating section 6 and may each clamp one electric conductor on conductor seating section 6. Base section 3 is designed to be larger compared to the first example, so that the contact piece may provide a common base section 3 for both clamping springs 7 and form two pocket-shaped conductor receptacles 5 for an inserted electrical conductor. In addition, contact piece 1 has two spring receiving sections 13, each including one spring receptacle 12 for suspending clamping springs 7 and one spring support 23 for additionally supporting clamping springs 7 via contact piece 1. Spring receiving sections 13 may be bent away from two side walls 22 of base section 3 situated opposite each other. With the second example, it is possible not only to implement two conductor terminals using one contact piece 1, but also to facilitate a symmetrical introduction of force into conductor seating section 6, so that the self-retention of the self-supporting contact system made up of contact insert 1 and clamping springs 7 may be further improved.

FIG. 7 shows a plug connector 18, which includes an insulating housing 19, into which a contact insert 2 having a contact piece 1 and a clamping spring 7 is inserted, insulating housing 19 being depicted in this illustration without a cover part closing a mounting opening. Insulating housing 19 insulates contact insert 2 and protects it against external environmental influences. In addition, insulating housing 19 may absorb residual contact forces of contact insert 2, in that, for example, conductor seating section 6 is additionally supported against a support bar 24 of insulating housing 19.

Figure 8:
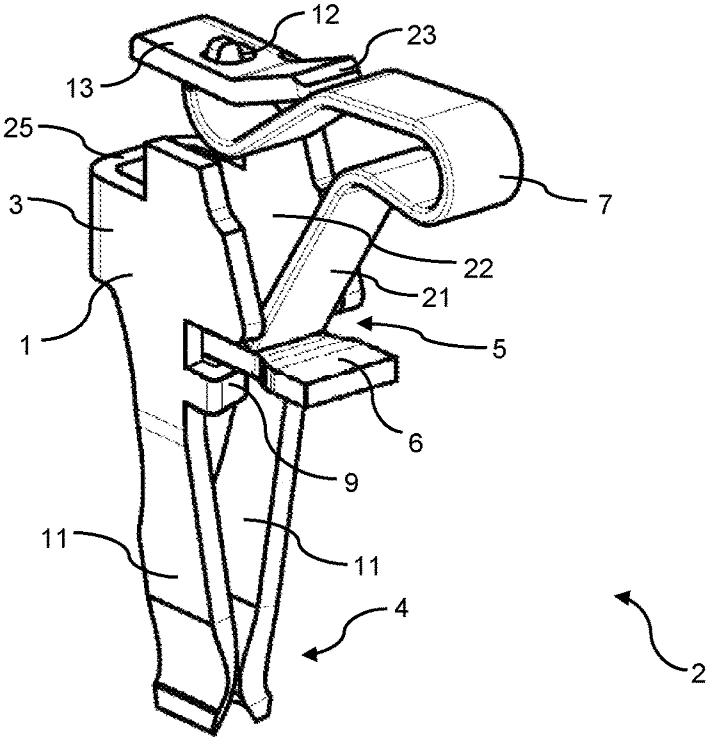
FIG. 8 schematically shows a perspective view of a contact insert for a plug connector, including a contact piece according to the invention and a clamping spring.

FIG. 8 shows a contact insert 2 for a plug connector 18, including a contact piece 1 according to the invention and a clamping spring 7 according to a third example. In this example, support contour 9 is designed as a bearing projection of contact piece 1 on a side of conductor seating section 6 opposite a clamped conductor. The bearing projection may be formed in the manner of a web and be bent away from base section 3, for example from a side wall 22 of base section 3 or contact pin connection 4. Two bearing projections may also be bent away from side walls 22 of the base section situated opposite each other. Conductor seating section 6 is supported on support contour 9 and thus permits an improved self-retention of contact insert 2.

Within the scope of the present invention, combinations of the described design variants are also conceivable. For example, multiple different support contours 9 may be provided on contact piece 1, so that conductor seating section 6 includes support contours 9 designed as latching contours, latching openings 10 are provided in side walls 22 of base section 3, and bearing projections additionally project from base section 3 as further support contours 9. The fixing of conductor seating section 6 on contact piece 1 may be further optimized hereby.

Figure 9:
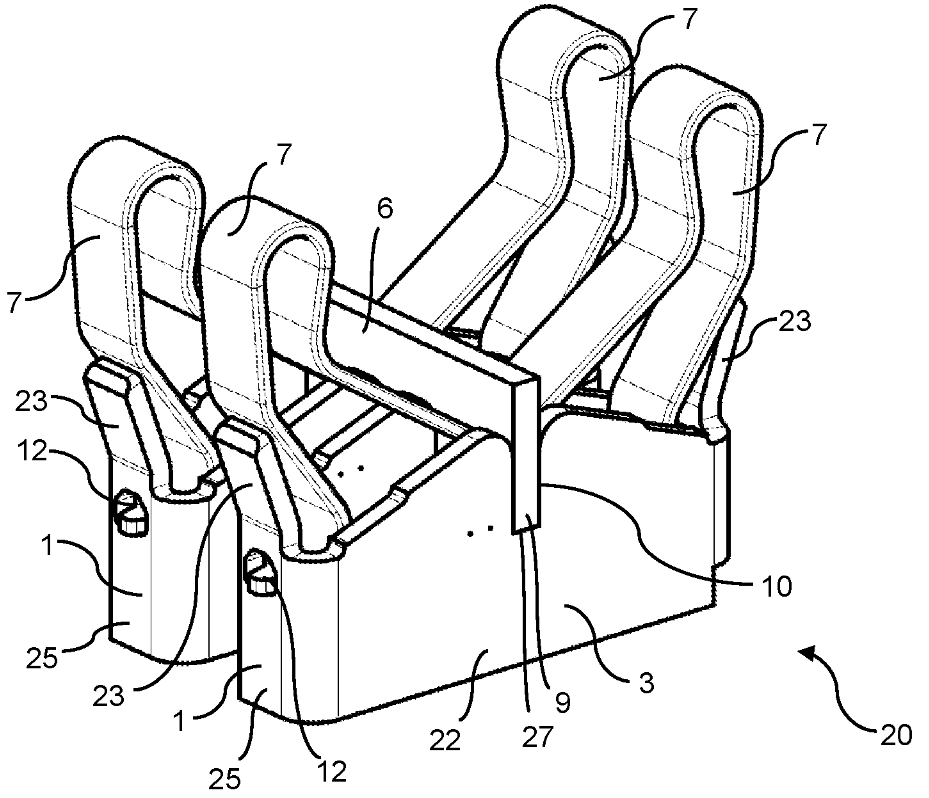
FIG. 9 schematically shows a perspective view of a distribution block, including two contact pieces and four clamping springs.
Figure 10:
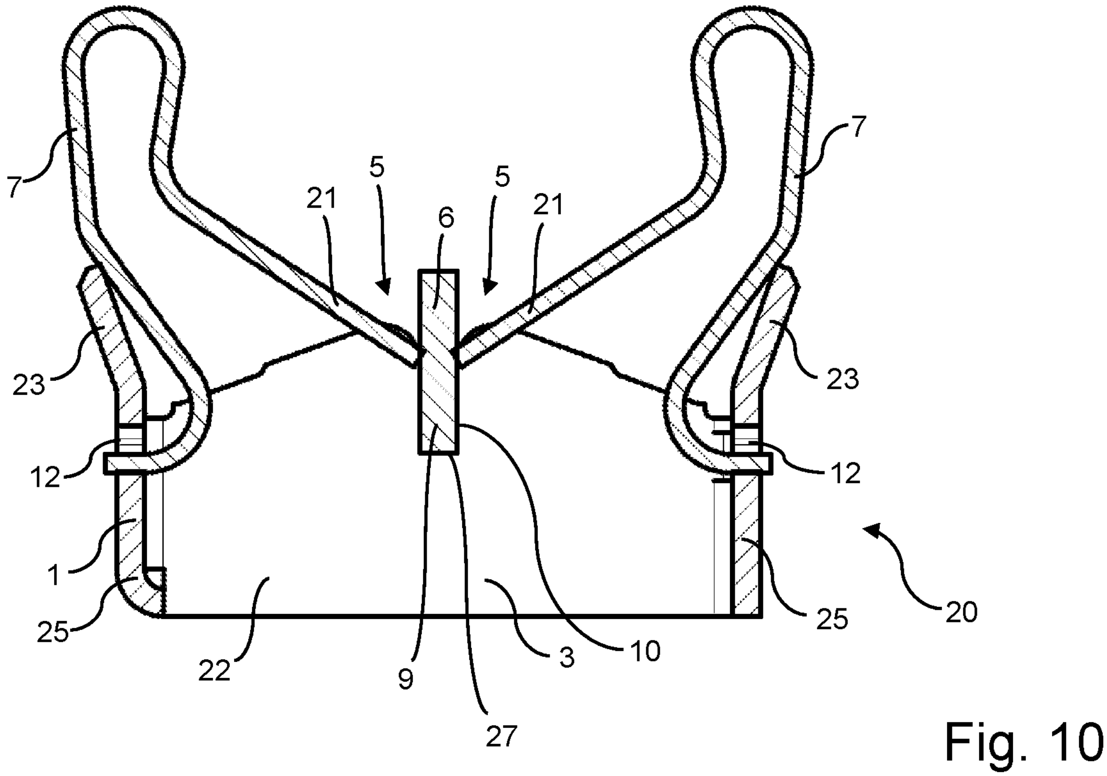
FIG. 10 shows a cutaway view of the distribution block according to FIG. 9.

FIGS. 9 and 10 show a distribution block 20, which includes two contact pieces 1 and four clamping springs 7, in a perspective view and a cutaway view. Contact pieces 1 are arranged side by side and have a base section 3 as well as a conductor receptacle 5 with a conductor seating section 6, which connects the two contact pieces 1 to each other. Contact pieces 1 are thus bridged with the aid of conductor seating section 6. Conductor seating section 6 is provided with a web-shaped or strip-shaped design and engages with groove-shaped openings 27 of base sections 3 of contact pieces 1 with a subsection forming a support contour 9, so that conductor seating section 6 is fixed on base sections 3 of contact pieces 1. In each case, two clamping springs 7 assigned to one contact piece 1 are arranged on both sides of conductor seating section 6 and may each clamp one inserted electrical conductor in conductor receptacle 5 with the aid of a clamping leg 21 of clamping spring 7 on conductor seating section 6. Contact pieces 1 additional have two spring receptacles 12 and two spring supports 23 for the two clamping springs 7. Distribution block 20 may be inserted into an insulating housing.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A contact piece for a contact insert of a plug connector, the contact piece comprising:

a base section;

a contact pin connection; and a conductor receptacle with a conductor seating section to clamp an electrical conductor with the aid of a clamping spring, the conductor seating section being bent away from the base section and is fixed on the base section and/or the contact pin connection via a support contour, wherein the support contour is a latching contour.

2. The contact piece according to claim 1, wherein the contact piece is a single piece.

3. The contact piece according to claim 1, wherein the contact pin connection and the conductor receptacle are oriented with respect to each other such that a conductor insertion direction of the electrical conductor and a contact pin insertion direction run at an angle to each other.

4. The contact piece according to claim 1, wherein the contact pin connection is a contact pin, which includes at least one contact pin arm protruding from the base section, or as a contact pin receptacle, which includes at least one contact pin receiving arm protruding from the base section.

5. The contact piece according to claim 1, wherein the support contour is arranged in a plane of the conductor seating section.

6. The contact piece according to claim 1, wherein the conductor seating section has at least two support contours arranged opposite each other, which fix the conductor seating section onto the base section and/or the contact pin connection in a bent state of the conductor seating section.

7. The contact piece according to claim 1, wherein the contact piece has a spring receiving section with a spring receptacle to fasten the clamping spring on the contact piece.

8. The contact piece according to claim 7, wherein the base section, the contact pin connection, the conductor seating section, and/or the spring receiving section are at least partially coated.

9. The contact piece according to claim 7, wherein the conductor seating section, a rear wall of the base section, and the spring receiving section are arranged with respect to each other in a U-shaped or C-shaped manner.

10. The contact piece according to claim 1, wherein the contact piece is configured to receive at least two clamping springs.

11. The contact piece according to claim 1, wherein the latching contour engages with an associated latching opening.

12. The contact piece according to claim 11, wherein the latching opening is arranged on the base section and/or the contact pin connection.

13. A contact insert for a plug connector, the contact insert comprising:

the contact piece according to claim 1; and the clamping spring inserted into the contact piece.

14. The contact insert according to claim 13, wherein the clamping spring has an open spring contour.

15. A plug connector that comprises the contact insert according to claim 13.

16. A cut sheet section to manufacture a contact piece for a plug connector, the cut sheet section, in an unbent planar state, comprising:

a base section;

two material tongues, which extend essentially in parallel to each other and are provided for forming contact pin arms or contact pin receiving arms for a contact pin connection of the contact piece, and protrude from the base section in a first direction; and a material strip to form a conductor seating section of a conductor receptacle of the contact piece, the material strip extending between the material tongues essentially in parallel thereto, wherein at least one material tongue, the base section, and/or the material strip have a support contour that is adapted to fix the material strip in a bent position on the base section and/or the contact pin connection after a bending operation.

17. The cut sheet section according to claim 16, wherein, in the base section, a bending surface is arranged between a material tongue and the material strip and a further bending surface is arranged between the base section and the material strip.

18. The cut sheet section according to claim 16, wherein a material tab protrudes from the base section in a second direction, which is provided to form a spring receiving section of the contact piece, including a spring receptacle to fasten a clamping spring on the contact piece.

19. The cut sheet section according to claim 16, wherein the base section, the material tongues, the material strip, and/or the material tab is/are at least partially coated.

20. The cut sheet section according to claim 16, wherein the cut sheet section is manufactured by stamping it out of a planar semi-finished product.

21. A distribution block that comprises at least two contact pieces and at least two clamping springs, the contact pieces having a base section and a conductor receptacle with at least one conductor seating section connecting the at least two contact pieces to each other for clamping electrical conductors via the clamping springs, the at least one conductor seating section being fixed on the base sections of the contact pieces via a support contour, in which a portion of the at least one conductor seating section is inserted into groove-shaped openings of the base sections of the at least two contact pieces.

* * * * *